United States Patent [19]

Pedinoff et al.

[11] 4,221,464
[45] Sep. 9, 1980

[54] HYBRID BREWSTER'S ANGLE WIRE GRID INFRARED POLARIZER

[75] Inventors: Melvin E. Pedinoff, Canoga Park; Oscar M. Stafsudd, Los Angeles; Morris Braunstein, Marina Del Rey, all of Calif.

[73] Assignee: Hughes Aircraft Company, Culver City, Calif.

[21] Appl. No.: 952,170

[22] Filed: Oct. 17, 1978

[51] Int. Cl.³ .............................................. G02B 5/30
[52] U.S. Cl. .................................................... 350/152
[58] Field of Search ................................ 350/149, 152

[56] References Cited

U.S. PATENT DOCUMENTS

| | | | |
|---|---|---|---|
| 3,428,388 | 2/1969 | Kuebler et al. | 350/152 |
| 3,439,968 | 4/1969 | Hansen et al. | 350/152 |

OTHER PUBLICATIONS

Bird et al., "The Wire Grid as a Near-Infrared Polarizer" JOSA, vol. 50, No. 9, pp. 886–891, (Sep. 1960).

Gerritsen, H. J., "Infrared Polarizer" RCA Technical Notes, No. 608, Mar. 1965.

Primary Examiner—John K. Corbin
Assistant Examiner—R. A. Rosenberger
Attorney, Agent, or Firm—Allen A. Dicke, Jr.; W. H. MacAllister

[57] ABSTRACT

There is disclosed a polarizer particularly suited for use in the infrared wavelengths which comprises a wire grid polarizer in optically cascaded relationship with a Brewster's Angle Polarizer. Not only do the extinction ratios of the optically cascaded polarizers multiply to provide higher extinction ratios at these wavelengths, but also the reflective mirror properties of the wire grid polarizers can be used in combination with the known optical properties of Brewster Polarizers to provide a combined device which optimizes both the extinction ratios achieved and the balance between the reflection and recombination problem of the system on the one hand and the offset or beam walking problem on the other hand in a manner to provide optical characteristics which are not achievable from any simple combinations of either type of polarizer alone.

1 Claim, 4 Drawing Figures

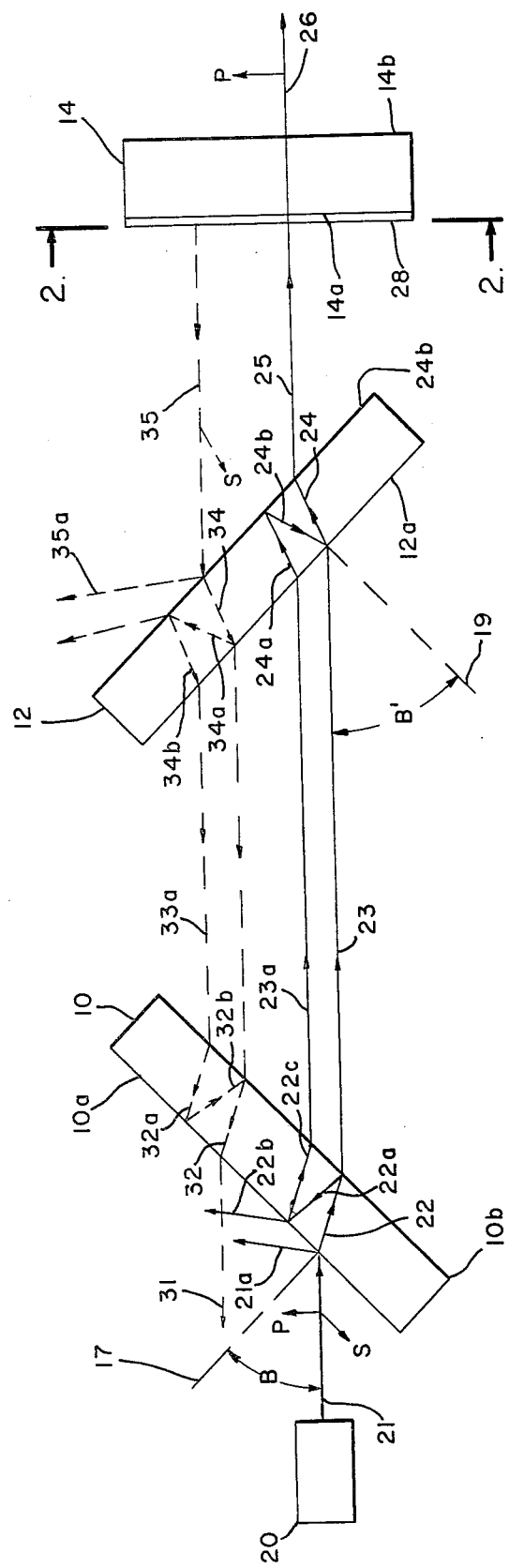
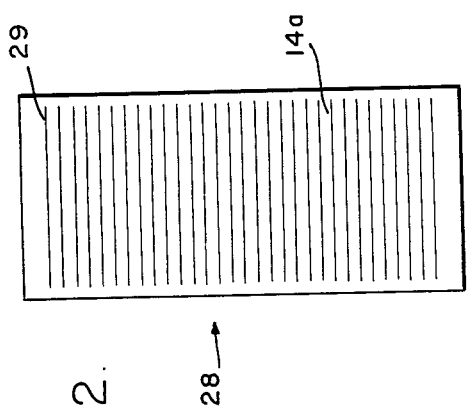
Fig. 1.
Fig. 2.

HYBRID BREWSTER'S ANGLE WIRE GRID INFRARED POLARIZER

The government has rights in this invention pursuant to Contract No. F19628-76-C-0309 awarded by the U.S. Air Force.

BACKGROUND OF THE INVENTION

The present invention is directed to devices useful for polarizing the coherent light output of infrared lasers. Polarization and polarization devices broadly, and particularly in the visible region of the electromagnetic spectrum, have been known for many years. See, for example, chapter 24 of a book entitled, "Fundamentals of Optics", by Frances A. Jenkins and Harvey E. White, published by the McGraw-Hill Book Company in 1957. For a description of the particular Brewster's Angle Polarizer being discussed herein reference is made to FIG. 24d on page 491 of that volume. For an alternate point of view, reference is also made to chapter 2 of a book entitled, "Introduction to Modern Optics", written by Grant R. Fowles and published by Holt, Reinhart, and Winston, Inc. in 1968.

As will seen by the above, polarizing devices for use in the visible wavelength region of the spectrum have been made quite efficient. That is to say, single crystal polarizers can be fabricated which have very high polarization extinction ratios; where that term is here taken to mean the ratio of the intensity of polarized light transmitted when the polarizers are aligned to the intensity of the same input light transmitted when the polarizers are crossed. This is not so easily achieved in the infrared wavelength region, however, with devices of any practical size or complexity.

One approach which has recently been taken toward infrared polarizers is the so-called "wire grid" polarizer. This device is described, for example, in an article by G. R. Bird et al entitled, "The Wire Grid as a Near Infrared Polarizer", published in the *Journal of Optical Society of America*, Vol. 50, No. 9, September 1960, beginning at page 886. See also an article by P. A. Cheo and C. D. Bass entitled, "Efficient Wire-Grid Duplexer Polarizer for $CO_2$ Lasers", published in *Applied Physics Letters*, Vol. 18, No. 12, on 15 June 1971, beginning at page 565, and also an article by Hugh L. Garvin entitled "High Resolution Fabrication by Ion Beam Sputtering", published in the magazine, *Solid State Technology*, in November 1973 beginning at page 31.

The wire grid polarizer is an array of closely-spaced parallel wires supported by a transmitting substrate. For wavelengths significantly shorter than the spacing of the wires, radiation with an E vector parallel to the wires will be reflected. Due to reflection from the surfaces of the supporting substrates, the reflected beam will contain a mixture of E (parallel) and E (perpendicular) radiation. These wire grid polarizers may be obtained from PTR Optics, Corp., 145 Newton St., Waltham, Mass. 02154. This company deals in infrared laser optics and their literature states that the wire grid polarizers produced by PTR are constructed by ruling a finally blazed diffraction grating on a precisely polished zinc selenide substrate. The ruled area is then coated with aluminum vacuum deposited at an oblique angle to form highly conductive wires at the peaks of the grooves. The 15 mm square polarizers are mounted in 25 mm diameter anodized aluminum holders. For a device having 1200 lines per millimeter on a zinc selenide substrate, the extinction ratio is stated to be greater than 40 to 1 at 2.5 microns radiation wavelength, greater than 100 to 1 at 3 microns, greater than 400 to 1 at 4 microns, and greater than 1000 to 1 at 10 microns.

In many practical applications, one desires higher extinction ratios than those quoted. Also one wishes to have an arrangement which eliminates the back reflected component which might otherwise be returned to the laser source and degrade modulation or other measured effects while at the same time providing an output beam which is in the same projected line or direction as the input beam to the polarizer and has thus not been deviated by passage through the polarizer even under conditions of rotation thereof.

It is an object of this invention to provide a polarizing arrangement which can achieve each of the foregoing characteristics simultaneously.

BRIEF DESCRIPTION OF THE DRAWINGS

These and other objects features and advantages of the invention will be more fully apparent to those skilled in the art from the detailed description of the invention below taken in conjunction with the accompanying drawings wherein like reference characters refer to like parts throughout and in which:

FIG. 1 is a sectional diagrammatic view illustrating the invention.

FIG. 2 is a diagrammatic view taken on the line 2—2 of FIG. 1.

DETAILED DESCRIPTION OF THE INVENTION

As has been noted above, both the Brewster Angle Polarizer per se and the wire grid polarizer per se are well known in the art. Both devices have been in active use since the development of the laser. When, as is intended herein, however, one is designing a polarizer for use with a laser it is especially important not only that the extinction ratio be as high as possible, but also that at the same time the device reduces the back-reflective component to a negligible value. This feature is especially useful when dealing with laser systems where back-reflective signals can be amplified. Furthermore, it is desired that the input beam provided to the polarizer exit from the polarizer system in the same direction or axis as that occupied by the input beam regardless of the rotational position of the polarizing device. That is, it is desirable to avoid displacement or "walking" of the beam as it passes through the polarizer. None of the prior art devices alone are capable of achieving simultaneously all of the desired features.

There is illustrated in FIGS. 1 through 4 various combinations of a wire grid polarizer with a double-plate Brewster's Angle Polarizer. This invention essentially eliminates troublesome temperature induced changes in the extinction ratio of parallel plate constucted Brewster's Angle Polarizers. The addition of the wire grid polarizer with an extinction ratio of 100 to a Brewster's Angle Polarizer with an extinction ratio of 200 results in a hybrid polarizer with an extinction ratio of 20,000 since the overall extinction ratio is the product of the individual ratios. Thus, a wire grid polarizer which may have a relatively low extinction ratio at a particular wavelength can still be useful since it can multiply the extinction ratio of the double plate Brewster's and, as will be described below, can also serve to eliminate back reflection. This hybrid device occupies little more space than the Brewster's Angle device and reflects no light back to the light source because of the unique geometry employed. In addition, the device will not deviate the direction of the beam as it is rotated.

Figure 3:
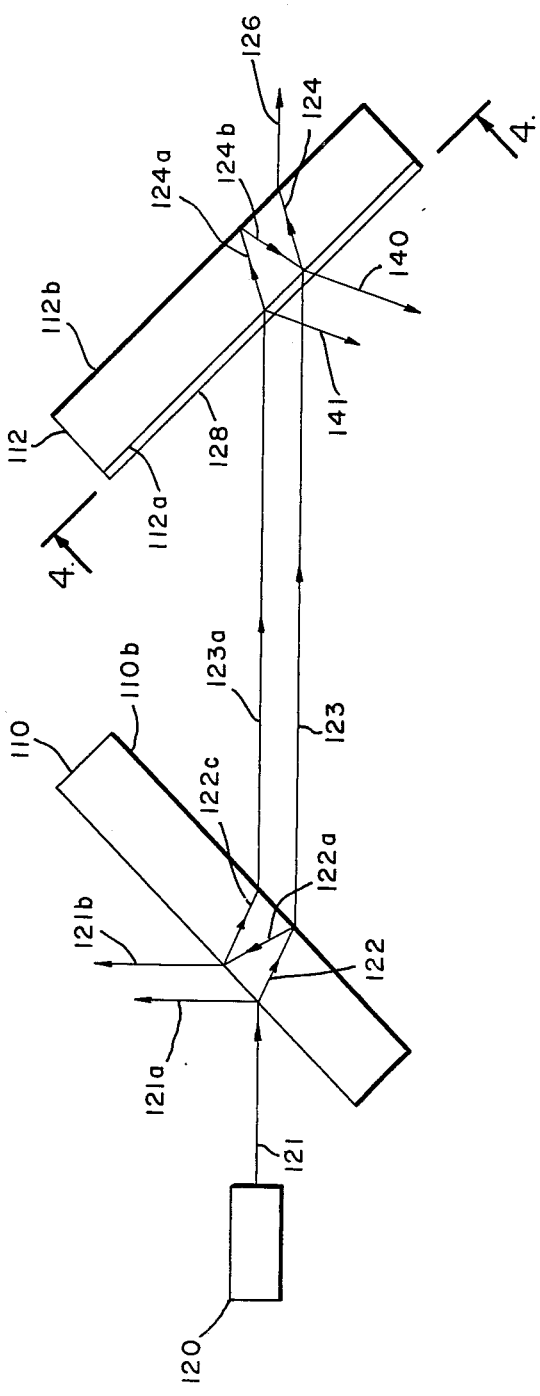
FIG. 3 is a sectional diagrammatic view of a second embodiment of the invention.
Figure 4:
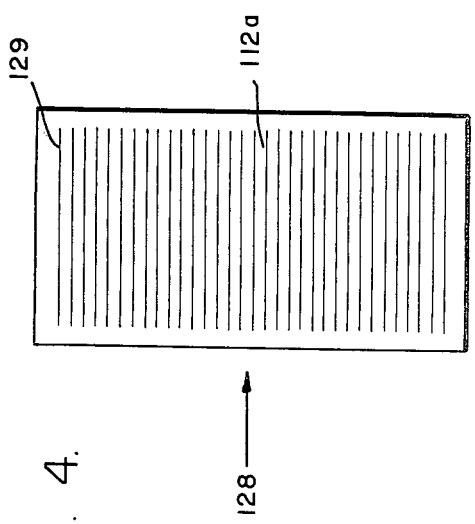
FIG. 4 is a view taken on the line 4—4 of FIG. 3.

One rudimentary form of the device is shown in FIGS. 1 and 2 and a more advanced or preferred embodiment is shown on FIGS. 3 and 4.

There is shown in FIGS. 1 and 2 a laser light source 20, first and second plates 10 and 12 respectively of a double plate Brewster's Angle Polarizer, wherein the plates have crossed polarization axes, and a plate 14 on the first surface 14a of which is formed a wire grid polarizer 28. An unpolarized light beam from laser 20 is refracted at the first surface 10a of plate 10 resulting in a beam 22 which passes through the plate 10 and exits the second surface 10b thereof to continue as ray 23 which is refracted at the first surface 12a of plate 12 and is shown thereafter as ray 24 which is again refracted as it exits from the second surface 12b of plate 12 becoming thereafter ray 25 which is applied perpendicularly to the first surface 14a of plate 14 on which the wire grid polarizer 28 is formed. This beam exits from plate 14 as beam 26 which is undeviated in direction from the input beam 21 as long as the plates 10, 12 and 14 each have parallel first and second major surfaces and are correctly positioned. A necessary condition of this non-deviation is that the normal 17 to the first surface 10a of plate 10 and the normal 19 to the first surface 12a of the plate 12 each make the same angle with the rays 21 and 23 respectively. That is to say, if the ray 21 is taken to be in the horizontal plane, than Brewster's Angle B which is formed between this ray 21 and the normal 17 to the surface 10a at the point where 21 is incident thereon is equal to the angle B' between the parallel ray 23 and the normal 19 to the surface 12a of the second plate which is also equal to Brewster's Angle.

As is shown in the above referenced text, Brewster's Angle is equal to the angle whose tangent is equal to the index of refraction of the plate where the other medium is air having an index refraction of one as is the case herein. Plates 10 and 12 are preferably germanium or zinc selenide or any high index optical material which is transmissive to infrared radiation. In a typical preferred example being described herein, this radiation had a wavelength of 10.6 micrometers. However, by infrared radiation, it is understood that the wavelength may range from 1 to 100 micrometers. For the particular case where germanium is used, the index of refraction is approximately equal to 4, and Brewster's Angle is approximately equal to 75.96°.

It will be noticed that in referring to a double plate Brewster's Angle Polarizer, it is implied that each of the plates have parallel first and second surfaces rather than tapered or wedged cross-sections and that the plates are symmetrically arranged in mirror image fashion with respect to each other in relation to the path followed by the principal ray 21, 22, 23, 24 etc. That is to say, the first face 12a of the second plate 12 is positioned at an angle with respect to said beam direction which is equal to 180° minus the angle between the first face 10a of the first plate 10 and said beam direction to form a symmetric mirror image of the first plate. This arrangement necessarily results in the above-noted relations of the normal and implies that Brewster's Angle is formed with the respective normals on opposite sides of the principal ray path for the first and second plates respectively as can be seen in FIG. 1.

In FIG. 1, the input wave 21 generated by laser source 20 is unpolarized and becomes partially polarized by reflection at the first, second, third and fourth boundaries represented by surfaces 10a, 10b, 12a, 12b, respectively. The orthogonal vecors S and P on the ray 21 indicate the two possible planes of polarization. At the first surface 10a, the S state waves are reflected as indicated by vector 21a. The refracted portion in ray 22 contains a mixture of both P and S state. Similarly, the ray 23 which is a refracted continuation of ray 22 also contains a mixture of P and S state and is not therefore completely polarized.

The wave generated by the second reflection at the first face 10a, that is by the reflection of the ray 22a as 22c which is thereafter transmitted through the second face 10b as ray 23a is composed largely of the orthogonal or the S polarization to wave 23. This secondary wave can usually be neglected in systems where the faces 10a and 10b of the plate 10 are wedged differently than are the faces 12a and 12b of the second plate. However, introducing such wedging solves one problem but introduces another in that it results in a displacement of the output wave from the original path direction and will also produce a deviation which varies as the polarizer is rotated. In many applications, this is undesirable. When, as shown in FIG. 1, the faces are all parallel, the waves in the 23a are again refracted by the first face 12a of the second plate into ray 24a which is reflected from the second face 12d as the ray 24b and thereafter recombines with the wave 24 to degrade its polarization purity. This comes about because the S-type polarization which was reflected in ray 22a is transmitted through 22c, 23a, 24a, and 24b to recombine with ray 24. Furthermore, the device is easily affected by temperature and the extinction ratio is not fixed.

Placing the wire grid polarizer on the surface 14a of plate 14 which as shown is perpendicular to ray 25 rejects the dominant S polarization in wave 23a, 24a, 24b, 24 and finally 25 by reflection. This is indicated in the drawing by the dashed line rays 35, 34, 33, 32, 31 and their related rays. For clarity of illustration these rays have been shown displaced from the single solid line incoming ray 25, but it will be undstood that, in fact, for each ray such as 25 there is a superposed reflected ray such as 35. Ordinarily any reflection from a wire grid polarizer would pass back to the laser unless the polarizer was tilted. However, in this invention, the reflected wave loses part of its energy at each of the four faces where refraction occurs thus attenuating the back reflected wave. The combined action of these components produces an optical extinction ratio that is greater than the extinction ratio of either component alone. In many applications, one cannot use two double-plate Brewster's Angle Polarizers cascaded one after the other because of space limitations. The wire grid polarizer when added to a Brewster Polarizer does not appreciably lengthen the structure even in the configuration shown in FIG. 1.

As may be seen in FIG. 2, and as is well known in the art cited above, the wire grid polarizer 28 is formed on the surface 14a of the plate 14 which acts as a substrate for it. As noted, plate 14 is a material transparent to the electromagnetic waves of the desired wavelength and is provided on the surface 14a with a plurality of parallel electrically conductive strips 29 having a predetermined width and center-to-center spacing. The surface 14a is in a position to receive the electromagnetic waves. Substantially all of the electromagnetic radiation incident on the wire grid polarizer which has its electric field vector parallel to the length of the conductor strips 29 is reflected, and substantialy all of the incident electromagnetic radiation having its electrofield vector perpendicular to the length of the strips 29 is transmitted through the wire grid polarizer. Of course, in practice, a small amount of the incident electromagnetic radiation is lost, due primarily to surface waves on the wire grid, especially for the reflected polarization. It is, of course, the reflected waves which give rise to the ray 35 shown in FIG. 1 which is in turn transmitted back through the plates 12 and 10. Even in the arrangement of FIG. 1, the attenuation resulting from the multiple reflections of this reflected wave 35 as it passes through plates 12 and 10 greatly reduces the reflected component. Furthermore, it will be noted that the output ray 26 has the same axial direction as the input ray 21. That is to say, there is no displacement or stepping of this ray as it passes through the polarizing system regardless of the rotary orientation of the system. This is due to the symmetric arrangement of the plates 10 and 12 in combination with the fact of a perpendicular incidence on the wire grid polarizer. Hence, with greatly reduced back reflection, the ray is transmitted in an undeviated manner and the extinction coefficients are multiplied in the manner noted above for a very high, overall system extinction ratio. It follows that for a wire grid polarizer whose extinction ratio might be quite low due to practicality of wire dimensions and spacing at a given wavelength, the system shown will multiply that ratio by the ratios of the double plate Brewster's Angle Polarizer without sacrificing any of the non-deviation properties of the wire grid polarizer used alone.

In FIGS. 3 and 4, there is shown a second and preferred embodiment of the polarizing system. In these figures, reference characters indicating parts which are analogous to parts which have been discussed in connection with FIGS. 1 and 2 are taken to be the reference characters used in connection with the FIGS. 1 and 2 but increased by 100. Thus, the double-plate Brewster's Angle Polarizer comprises plates 110 and 112 which are positioned in a maner similar to that described in connection with FIG. 1.

The polarizer of FIG. 3 differs from that of FIG. 1 in that the wire grid polarizer 128 is formed on the first surface 112a of the second plate 112 of the Brewster's Angle Polarizer itself rather than on a separate substrate plate as shown in FIG. 1. This has the advantage that when the ray 121, which is refracted as ray 122 and again refracted as ray 123, reaches the first surface of the second plate 112, it is incident on the wire grid polarizer 128 at an acute rather than a perpendicular angle. Thus, the reflected portion from surface 112a of the principal ray 123 is the ray 140 which is no longer reflected back through the polarizing system to the input as was the case with ray 35 in FIG. 1. The secondary ray 122a, 122c and 123a is also similarly reflected as to the non-transmitted component at the surface 112a by the wire grid polarizer 128 resulting in the ray 141. Hence, in this arrangement, there is no component such as that shown at 35 in FIG. 1 to be reflected back to the laser source. All of the other advantages discussed in connection with FIGS. 1 and 2 are preserved in this arrangement in addition to the total elimination of the reflected component. That is to say, the extinction ratios are still the product of the individual extinction ratios and the ray 121 results in an output ray 126 which is undeviated from the original ray direction.

Of course, it will be understood that the wire grid polarizer could be placed on other surfaces of the doubleplate Brewster's Angle Polarizer such as the second surface 112b of plate 112, but the arrangement shown has been found in practice to be most practical.

The performance of the device of FIG. 1 has been tested in the laboratory using non-commercial wire grid polarizers. Extinction ratios taken with hybrid polarizers were between 800 and 2,000 when various combinations of plate and grid polarizers were assembled. The extinction ratios of the parallel-sided Brewster's Angle Polarizers fluctuated in the range from 50 to 170 with temperature. If commerical grade wire grid polarizers are used performance would be expected to increase by an order of magnitude over these figures. Thus, the combination or hybrid structure represents a substantial advance in the state of the art. Of course it will be understood that in applications where space is not critical that any number of either type of polarizer may be casaded in various combinations to achieve higher extinction ratios. With respect to FIG. 3, it will be noted that with no increase in the size of the device, the extinction ratio is substantially increased, non-deviation is maintained, and reflected energy is minimized.

What is claimed is:

1. A polarizer for infrared radiation comprising:
a symmetric double-plate Brewster's angle polarizer having first and second plates, each of said first and second plates being made of a material transparent to infrared radiation and each plate having first and second parallel faces, the first of said plates being positioned so that the angle between the normal to the front face of said plate and the direction of incidence of a beam of infrared radiation is equal to Brewster's angle which in turn is equal to the angle whose tangent is equal to the index of the refraction of the material of said plate, the front face of said second plate being of said plate, the front face of said second plate being positioned at angle with respect to said beam direction which is equal to 180 minus the angle between the front face of said first plate and said beam direction to form a symmetric mirror image of said first plate; and
a wire grid polarizer arranged in optically cascaded relationship therewith, said wire grid polarizer being formed on the front face of said second plate which is optically adjacent to the second face of said first plate.

* * * * *